United States Patent [19]

Klee

[11] Patent Number: 5,760,142
[45] Date of Patent: Jun. 2, 1998

[54] EPOXIDE-AMINE DENDRIMERS AND THE PREPARATION AND USE THEREOF

[75] Inventor: Joachim E. Klee, Radolfzell, Germany

[73] Assignee: Dentsply DeTrey G.m.b.H., Dreieich, Germany

[21] Appl. No.: 759,504

[22] Filed: Dec. 4, 1996

[51] Int. Cl.⁶ .................................................. C08G 65/08
[52] U.S. Cl. .......................... 525/403; 525/404; 525/405; 525/406; 525/407; 525/408; 525/409; 528/73; 528/105; 528/104; 528/250; 528/327; 528/366; 528/374; 528/376; 528/393; 528/405; 528/407; 528/420; 528/421
[58] Field of Search .................................. 525/403, 404, 525/405, 406, 407, 408, 409; 528/73, 105, 104, 250, 327, 366, 374, 376, 393, 405, 407, 420, 421

[56] References Cited

U.S. PATENT DOCUMENTS

| | | | |
|---|---|---|---|
| 4,485,211 | 11/1984 | Okamoto et al. | 525/57 |
| 4,558,120 | 12/1985 | Tomalia et al. | 528/363 |
| 4,587,329 | 5/1986 | Tomalia et al. | 528/363 |
| 4,857,599 | 8/1989 | Tomalia et al. | 528/259 |
| 5,274,064 | 12/1993 | Sarkar | 528/25 |
| 5,395,883 | 3/1995 | Yates, III et al. | 525/89 |
| 5,418,301 | 5/1995 | Hult et al. | 525/437 |
| 5,530,092 | 6/1996 | Meijer et al. | 528/363 |
| 5,591,809 | 1/1997 | Vicari et al. | 525/419 |

FOREIGN PATENT DOCUMENTS 0 716 103  11/1995  Germany.

*Primary Examiner*—Frederick Krass
*Attorney, Agent, or Firm*—Douglas J. Hura; James B. Bieber

[57] ABSTRACT

Epoxide-amine dendrimers synthesized by a repetitive and step-wise addition reaction of epoxides comprising functional moieties which are available for conversion into amino groups followed by a reaction of these groups to primary amino moieties. The amino terminated dendrimers are reacted with (2,3-epoxypropoxy) methacrylate, a monoepoxide and/or a monoisocyante. The methacrylate terminated dendrimers are polymerizable using redox initiators and/or photoinitiators. The resulting dendrimers show a very low volume shrinkage from that of the starting materials, on the order of less than about 5 percent by volume.

7 Claims, No Drawings

EPOXIDE-AMINE DENDRIMERS AND THE PREPARATION AND USE THEREOF

TECHNICAL FIELD

The invention relates to epoxide-amine dendrimers comprising cyano, amino, (meth) acrylate, epoxide and/or isocyanate endgroups which are suitable for dental and medical applications, pharmacy imaging, agrochemistry, photocopier toners, high resolution lithography, non-linear optical devices, molecular electronic devices, catalysts, resins and surface active agents (surfactants).

BACKGROUND OF THE INVENTION

Dendrimers, also known as Starburst polymers (Michigan Molecular institute) and cascade polymers are known in the art. The synthesis of a number of dendrimers is described in for example, PAMAM Starbursts, D.A. Tomalia et al., Top.Cur Chem. 165 (1993)194, Angew. Chem.Int.Ed.Engl. 138 (1990)29, Encyclopedia of Polymer Science and Engineering, 2nd.ed, Wiley, New York 1990, pp. 46–92. A large number of different types of dendrimers are described, including those prepared by the addition of acrylnitril and amines for the preparation of poly(amino) dendrimers which further are functionalized with methacrylate moieties (N. Moszner, Macromol. Chem. Phys. 197 (1996)621).

Examples of known dendrimers are those with the structure of poly(ethers), poly(thioethers), poly(esters), poly (amides), poly(esteramides), and poly(ether ketones). Frequently, hyperbranched polymers show a much more broad molecular distribution than dendritic polymers such as hyperbranched polyesters. Dendrimers with epoxide-amine repetitive moieties are not known in the art.

DISCLOSURE OF THE INVENTION

It is therefore, an object of the invention to provide a dendritic macromolecule.

It is another object of the invention to provide an epoxide-amine dendrimer.

It is a further object of the invention to provide a low-shrinking composite material containing such dendritic macromolecules.

These and other objects of the invention, which will become apparent from the following discussion, are carried out by the invention as herein described and claimed.

In general, a dendritic macromolecule according to the invention comprises a core molecule having a primary amino moiety, a thiol moiety, a phenol moiety, a carboxylic acid moiety or having at least two secondary amino moieties, and combinations thereof; and a branching molecule.

There is also provided according to the invention a method of preparing a dendritic macromolecule comprising the step of reacting a core molecule having at least two active HX-functions wherein the HX-function selected from the group of HN, HS, HP, HO-Aryl, and HOOC moieties with a branching molecule having one epoxide moiety and at least one moiety which is suitable for generation of at least a primary amino group.

DESCRIPTION OF THE PREFERRED EMBODIMENTS

The present invention is directed toward an epoxide-amine dendrimer useful for example in dental and medical applications, pharmacy imaging, agrochemistry, photocopier toners, high resolution lithography, non-linear optical devices, molecular electronic devices, catalysts, resins and surface active agents (surfactants). The invention has particular application to dental uses as a polymerizable resin, as a filler material or the like. Dendritic polymers are discussed for example, in U.S. Pat. Nos. 5,530,092 and 5,418,301 which are hereby incorporated by reference for their general discussion of such polymers.

The core molecule is preferably a molecule having at least a primary amino moiety, a thiol moiety, a phenol moiety, a carboxylic acid moiety or having at least two secondary amino moieties, and combinations thereof. For example, useful core molecules include polyamines, polyphenols, polycarboxylic acids, polythiols or molecules having amino and thiol or amino and phenol or phenol and thiol moieties in one molecule such as $H_2N\text{—}R$, $H_2N\text{—}R\text{—}(NH_2)_n$, $HR_1N\text{—}R\text{—}(NR_1H)_n$, $HOOC\text{—}R\text{—}(COOH)_n$, $(HOOC)_m\text{—}R\text{—}(OH)_o$, $HS\text{—}R\text{—}(SH)_n$, $HO\text{—}R_2\text{—}(OH)_n$, $(HR_1N)_m\text{—}R\text{—}(SH)_o$, $(HR_1N)_m\text{—}R\text{—}(OH)_o$, $(HO)_m\text{—}R\text{—}(SH)_o$, $H_2N\text{—}(R\text{—}NH)_p\text{—}R\text{—}NH_2$, wherein R is a substituted or an unsubstituted $C_1$ to $C_{18}$ alkylene, $C_5$ to $C_{15}$ cycloalkylene or $C_6$ to $C_{18}$ arylen rest, $R_1$ is substituted or unsubstituted $C_1$ to $C_{18}$ alkylene, $C_5$ to $C_{15}$ cycloalkylene or $C_6$ to $C_{18}$ arylen rest, $R_2$ is substituted or unsubstituted $C_6$ to $C_{18}$ arylen rest, and m is an integer of from about 1 to about 5; n is an integer of from about 1 to about 6; o is an integer of from about 1 to about 5; and p is an integer of from about 1 to about 5.

Preferably, the branching molecule for the preparation of epoxide-amine dendrimers has the following structure

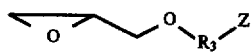

wherein $R_3$ is a substituted or an unsubstituted $C_1$ to $C_{18}$ alkylene, $C_5$ to $C_{18}$ cycloalkylene or $C_6$ to $C_{18}$ arylen rest, Z is a moiety selected from the group consisting of —CH=CH$_2$, —CHO, —CO—, —CONH$_2$, COCl, —COOR, —COOH, —X, —N$_3$, —NO$_2$, —CN, —NHOH, —NH$_3{}^+$x$^{31}$; X is Cl, I, Br, I, or OH. Preferably the branching molecule is selected from the group consisting of the following substituted or unsubstituted molecule s

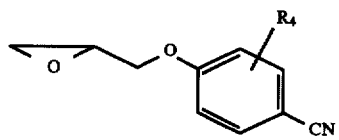

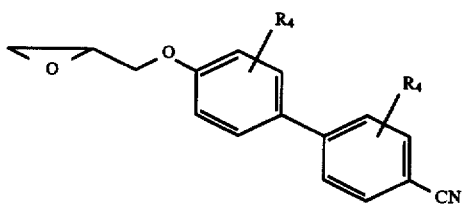

wherein $R_4$ denotes H or a substituted or an unsubstituted $C_1$ to $C_{18}$ alkylene, $C_5$ to $C_{15}$ cycloalkylene or $C_6$ to $C_{18}$ arylen rest.

An epoxide-amine dendrimer according to the invention is synthesized by reaction of the core molecule having at least two active HX-functions wherein the HX-function is selected from the group of HN, HS, HP, HO-Aryl and HOOC moieties with a branching molecule having one epoxide moiety and at least one moiety which is suitable for generation of at least a primary amino group, such as those discussed above and build-up reaction. The reaction of an epoxide-amine dendrimer is a repetitive reaction sequence of (a) reaction of the moieties which are suitable for generation of primary amino groups to primary amines; (b) an addition reaction of the branching molecules having one epoxide moiety and having at least one moiety which is suitable for generation of at least a primary amino group onto the primary amino moieties generated in (a) ; and, (c) a terminating reaction which is characterized in the addition reaction of at least a substituted or unsubstituted monoepoxide, monoisocyanate and/or an acrylate onto the amino functions of the dendrimer. The reaction (a) and addition reaction (b) are repeated at least one time to form an epoxide-amine-dendrimer.

For example an epoxide-amine dendrimer was synthesized by addition of 4 mols 4-Cyano-4'-(2,3-epoxypropoxy) benzene and 1 mol 3(4), 8(9)-bis (aminomethyl) tricyclo-5.2.1.0$^{2,6}$-decane followed by repetitive reduction of the nitril moieties and addition of 4-Cyano-4'-(2,3-epoxypropoxy) to the amino groups. The obtained dendrimer is characterized in that the repetitive branching moiety has the following structure

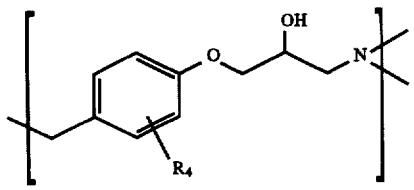

wherein $R_4$ is a hydrogen.

The reduction of the nitril moieties is possible using lithium aluminum hydride, Pd-Coal and hydrogen or using Raney-Ni and hydrogen. Each higher generation $G_n$ of the dendrimer is formed by addition m mols of 4-Cyano-4'-(2,3epoxypropoxy) to the lower aminoterminated generation $G_{n-1}$ according $$m = x \cdot 2^{(n-1)}$$

when the core molecule have four functions, whereas m is the number of mols of 4-Cyano-4'-(2,3-epoxypropoxy) and n is the number of generation.

Under these conditions the molecular mass $M_n$, of the dendrimer is calculated as $$M_n = M_k + \sum_{(n=1)}^{i} 2^{(n-1)} \cdot x \cdot M_{AAB}$$

wherein $M_k$ is the molecular mass of the core molecule having x reactive groups;

$M_{AAB}$ is the molecular mass of 4-Cyano-4'-(2,3-epoxypropoxy); and n is the number of generation.

It has been found that a dendrimer macromolecule as described and prepared as above, shows an amount of shrinking less than about 5 percent by weight as compared to the molecule's starting reactants. A composite material made from a plurality of such molecules will exhibit a similar low amount of shrinking.

General Experimental

EXAMPLE 1

Synthesis of 4-Cyano-4'-(2,3-epoxypropyl)-benzene (CNPGE)

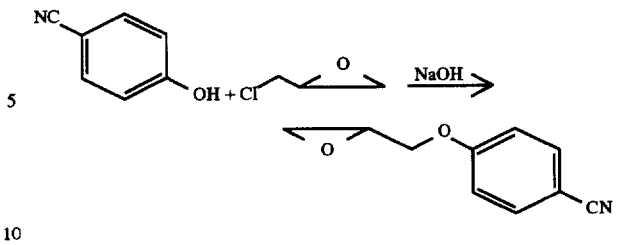

In a tree-necked bottle equipped with stirrer, refluxer and dropping funnel were dissolved 119.120 g of 4-Hydroxybenzonitril in 185.060 g of Epichlorhydrin. To this solution was dripped 160 ml of a 25% sodium hydroxide (40.000 g NaOH) during 6 hours at 75° C., so that the pH-value remain under 10. Thereafter the mixture was stirred for 8 hours at 80° C. (100° C. temperature of the oil bath). The product crystallizes from the hot separated Epichlorhydrin phase after cooling. The crude product was filtrated off, washed with Ethanol and recrystallized from dry Ethanol. $C_{10}H_9NO_2$ 175.19

Yield: 77.5 g (44.24% of th.), Fp. 64.6°–65.7°C. (67°C.), Kp$_{15}$=250°–255°C.

IR: 916, 3063 cm$^{-1}$ (Epoxide), 1259 cm$^{-1}$ (PhOCH$_2$), 2224 cm$^{-1}$ (CN)

$^{13}$C-NMR:161.49 (1), 133.72 (3), 118.80 (5), 115.16 (4), 104.16 (2), 68.87 (6), 49.51 (7), 44.12 (8)

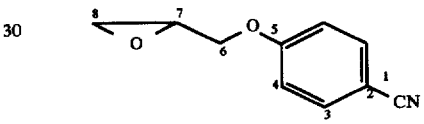

$^1$H-NMR: 7.58, 6.99 (Ar), 4.36, 3.95 (6), 3.38 (7), 2.93, 2.78 (8)

Synthesis of the first cyano terminated generation G1-CN 10.000 g (51.45 mmol) of TCD and 36.055 g of (205.81 mmol) CNPGE were dissolved in 50 ml THF. The solvent was removed and the remaining mixture was reacted for ten hours.

Yield: 46.055 g (100% of th.)

$T_g$=42.0°C.

IR: 3421 cm$^{-1}$ (OH), 2224 cm$^{-1}$ (CN), 1263 cm$^{-1}$ (PhOCH$_2$), no absorption at 3019 cm$^{-1}$ (Epoxide)

Reduction of the cyano moieties of G1-CN to amino terminated dendrimer G1-NH$_2$ To a solution of 44.000 g of (49.16 mmol) of G$_1$-CN dissolved in 250 ml THF were added under stirring and cooling a solution of 10.447 g (275.29 mmol) of LiAlH$_4$ in 120 ml THF. Thereafter the reaction mixture was stirred for 2 hours at room temperature. Than it was hydrolyzed by adding of ice water. The precipitated aluminum hydroxide was filtered off and washed with 50 ml of acetone and three times with 80 ml of CHCl$_3$/ CH$_3$OH (vol. ratio 4:1). Thereafter the solvents were evaporated and the remaining product was dissolved in CHCl$_3$/CH$_3$OH again. Than the solvent was evaporated and the product was dried in vacuum at 60°C.

Yield: 44.00 g (98.23% of th.), T$_g$58.1°C.

IR: 3367/3302 cm$^{-1}$ (NH$_2$), 1246 cm$^{-1}$ (PhOCH$_2$), no absorption at 2224cm$^{-1}$ (CN)

The repetitive addition reactions of CNPGE to the aminoterminated dendrimers G-NH$_2$ is given in Tab. 1. The reduction of the resulting G$_n$-CN dendrimers is summarized in Tab. 2.

TABLE 1

The addition reactions of CNPGE and of the aminoterminated dendrimers G—NH$_2$

| | TCD | | CNPGE | | G$_{(n-1)}$—NH$_2$ | | G$_n$—CN |
|---|---|---|---|---|---|---|---|
| | g | mmol | g | mmol | g | mmol | g |
| G$_1$ | 10.000 | 51.45 | 36.055 | 205.8 | | | 46.055 |
| G$_2$ | | | 64.089 | 365.9 | 41.670 | 45.7 | 105.759 |
| G$_3$ | | | 19.703 | 112.5 | 17.850 | 7.0 | 37.553 |
| G$_4$ | | | 18.101 | 103.3 | 16.830 | 3.2 | 34.931 |

TABLE 2

Reduction of the resulting nitril terminated G—CN dendrimers using LiAlH$_4$

| | G$_n$—CN | | LiAlH$_4$ | | G$_n$—NH$_2$ | | yield |
|---|---|---|---|---|---|---|---|
| | g | mmol | g | mmol | g | | % |
| G$_1$ | 44.000 | 49.16 | 10.447 | 275.3 | 44.00 | | 98.23 |
| G$_2$ | 46.735 | 18.8 | 6.836 | 180.1 | 20.92 | | 43.91 |
| G$_3$ | 34.000 | 6.7 | 6.073 | 160.0 | 23.50 | | 67.62 |
| G$_4$ | 45.000 | 4.0 | 5.809 | 153.1 | 40.00 | | 87.02 |

Methacrylate terminated epoxide-amine dendrimer G4-MA-1

14.000 g (1.28 mmol) of G$_4$-NH$_2$ 11.636 g of (81.85 mmol) (2.3-Epoxypropoxy) meth-acrylate and 0.026 g of tert. Butylcresol were dissolved in 50 ml of CHCl$_3$/CH$_3$OH. After removing the solvent the remaining mixture was reacted for seven hours at 70° C. Than the crude product was dissolved in 150 ml of CHCl$_3$/CH$_3$OH and precipitated in 800 ml of Acetone. The product was dried in vacuum at 80°C.

Yield: 25.661 g (100% of th.), T$_g$=70° C., Mn=20.045 g/mol.

IR: 3390 cm$^{-1}$ (OH), 1716 cm$^{-1}$ (CO), 1248 cm$^{-1}$ (PhOCH$_2$), no absorption of epoxide moieties at 910 cm$^{-1}$ The methacrylate terminated epoxide-amine dendrimer G4-MA-1 polymerized with 2 % (w/w) dibenzoyl peroxide exhibit a volumetric shrinkage of DV=4.3 %.

Methacrylate terminated epoxide-amine dendrimer G4-MA-2

14.000 g (1.28 mmol) of G$_4$-NH$_2$ 3.879 g of (27.28 mmol) (2.3-Epoxypropoxy) methacrylate, 8.194 g of (54.57 mmol) Phenylglycidyleter and 0.026 g of tert. Butylcresol were dissolved in 50 ml of CHCl$_3$/CH$_3$OH. After removing the solvent the remaining mixture was reacted for seven hours at 70° C. Than the crude product was dissolved in 150 ml of CHCl$_3$/CH$_3$OH and precipitated in 800 ml of Acetone. The product was dried in vacuum at 80° C., Mn-20.200 g/mol. Yield: 26.073 g (100% of th.), T$_g$=26.2°C.

IR: 3390 cm$^{-1}$ (OH), 1716 cm$^{-1}$ (CO), 1248 cm$^{-1}$ (PhOCH$_2$), no absorption of epoxide moieties at 910 cm$^{-1}$ The methacrylate-terminated epoxide-amine dendrimers of G4-MA-2 polymerized with 0.5% (w/w) of dibenzoyl peroxide and 0.5% (w/w) of N,N-bis(polydioxyethyl toluidine) exhibits a volumetric shrinkage of ΔV=2.6.

As shown hereinabove, the dendrimers of the present invention exhibit a low volumetric shrinkage of less than about 5%. As a comparison, the commonly used polymerizable monomers prior to this invention show a higher shrinkage. A list of these comparisons to the present invention is shown in Table 3 hereinbelow.

TABLE 3

COMPARISON OF MOLECULAR MASS AND VOLUMETRIC SHRINKAGE OF DIFFERENT MONOMER, EPOXIDE AMINE DENDRIMERS

| | Molecular mass g/mol | Volumetric shrinkage % |
|---|---|---|
| Methylmethacrylate | 100.1 | 23.0 |
| Triethylenglycoldimethacrylate (TGDMA) | 286.3 | 12.9 |
| Bis-GMA* | 512.2 | 4.6 |
| Bis-GMA/TGDMA (70/30) | — | 7.1 |
| G4-MA-1 | 20045.3 | 4.3 |
| G4-MA-2 | 20216.2 | 2.6 |
| G4-MA-2/TGDMA (90/10) | — | 3.6 |

*Bis-GMA = 2,2-Bis-[p-(2-hydroxy-3-methacryloyloxypropoxy)-phenyl]-propane

In order to decrease the shrinkage of the polymers heretofore known in the art, one method has been to make oligomers or macromonomers that have a higher molecular weight. However, it was found that with the increasing molecular weights, the viscosity of the resin also increased detrimentally. This means that a larger amount of reactive diluent was necessary to obtain a resin which was useable. Consequently, the shrinkage increased again by application of a low molecular weight diluent.

On the other hand, it is also known that dendritic polymers exhibit special rheologic properties due to their special geometry. In some cases, dendrimers are viscous materials which are useable without further diluents or only small amounts of diluents being necessary. The different behavior of a solution of linear polymers/macromonomers and dendrimers is explained by consideration of their structure. Linear polymers exist in the form of tangles of many single polymers. A large amount of solvent is necessary to unfold the polymers and bring them into solution. Dendrimers which are "ball-like" represent one dendritic polymer which is not physically connected with other polymers. Consequently, only small amounts of a diluent can dissolve these dendritic polymers.

This means in practice, that for example Bis-GMA is only usable in a mixture with at least 30% (w/w) of a diluent such as triethyleneglycoldimethacrylate. This mixture shows a relatively high shrinkage of ΔV=7.10%. The epoxide-amine dendrimers of this invention dissolved in 10% (w/w) of triethyleneglycoldimethacrylate. Consequently, only a shrinkage of ΔV=3.609 results.

The measurement of the shrinkage is based on the estimation of the density of polymerized and unpolymerized material. The densities were measured by an uplift-method (measuring the weight of the material in water).

It should of course be understood that this invention may be modified in various aspects related to composition ingredients, processing details and the like. Such modifications all are within the scope of the claims which follow.

What is claimed is:

1. A dendritic macromolecule comprising the reaction product of a core molecule having at least one primary amino moiety, at least two thiol moieties, at least two phenol moieties, at least two carboxylic acid moieties or having at least two secondary amino moieties, or combinations thereof; and a branching molecule; wherein said core molecule is selected from the group consisting of H$_2$N—R; H$_2$N—R—(NH$_2$)$_n$, HR$_1$N—R—(NR$_1$H)$_n$; HOOC—R—(COOH)$_n$; (HOOC)$_m$—R—(OH), HS—R—(SH)$_n$; HO—R$_2$—(OH)$_n$; (HR$_1$N)$_m$—R—(SH)$_o$; (HR$_1$N)$_m$—R—(OH)$_o$; (HO)$_m$—R—(SH)$_o$; and H$_2$N—(R—NH)$_p$—R—

$NH_2$ wherein R and $R_1$ are the same or different and are selected from the group consisting of $C_1$ to $C_{18}$ alkyl(ene), $C_5$ to $C_{15}$ cycloalkyl(ene) and $C_6$ to $C_{18}$ aryl(ene); $R_2$ is $C_6$ to $C_{18}$ arylene; and m is an integer of from about 1 to about 5; n is an integer of from about 1 to about 6; and o is and integer of from about 1 to about 5; and p is an integer of from about 1 to about 5; and, wherein the branching moiety resulting from said branching molecule has the structure

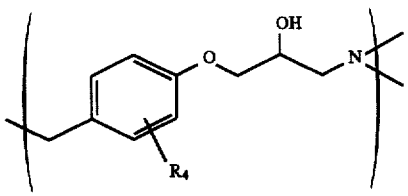

wherein $R_4$ is a $C_1$ to $C_{18}$ alkyl, $C_5$ to $C_{18}$ cycloalkyl or $C_6$ to $C_{18}$ aryl.

2. A method of preparing a dendritic macromolecule comprising the steps of:
   (a) reacting a core molecule having at least two active HX-functions wherein the HX-function is selected from the group consisting of HN, HS, HP, HO-Aryl, and HOOC moieties with a branching molecule having one epoxide moiety and at least one other moiety said moiety being capable of generating a primary amino group; (b) reacting said at least one other moiety to form a primary amine; (c) reacting by addition reaction said branching molecule with said primary amine generated in step(b); and (d) terminating the reaction.

3. A method as in claim 2 wherein said step of terminating the reaction includes the addition reaction of a monoeposide, a monoisocyanate or an acrylate onto the amino functions of the dendrimer.

4. A method as in claim 2 wherein said reactions and said addition reaction are repeated at least once.

5. A macromolecule prepared according to the method of claim 2.

6. A macromolecule as in claim 5, which shrinks less than about 5 percent by volume from the volume of the starting reactants.

7. A dendritic macromolecule comprising the reaction product of a core molecule having at least one primary amino moiety, at least two thiol moieties, at least two phenol moieties, at least two carboxylic acid moieties or having at least two secondary amino moieties, or combinations thereof; and a branching molecule; wherein said branching molecule is selected from the group consisting of molecules having the structures

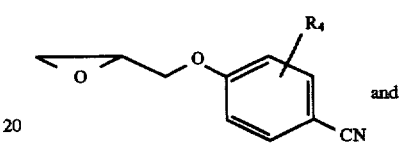
and
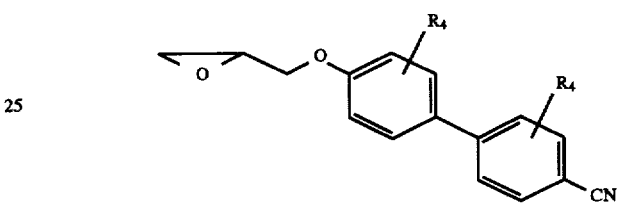

wherein $R_4$ denotes H or a $C_1$ to $C_{18}$ alkyl, $C_5$ to $C_{18}$ cycloalkyl or $C_6$ to $C_{18}$ aryl.

* * * * *